3,497,361
METHOD OF PREPARING A REASSEMBLED MEAT PRODUCT
Joseph C. Wilcox, Wheaton, Ill., and Millard J. Hafstad, Detroit Lakes, Minn., assignors to Armour Industrial Chemical Company, Chicago, Ill., a corporation of Delaware
No Drawing. Continuation-in-part of application Ser. No. 471,384, July 12, 1965. This application Feb. 4, 1969, Ser. No. 796,615
Int. Cl. A22c
U.S. Cl. 99—107     9 Claims

ABSTRACT OF THE DISCLOSURE

Small chunks of meat having a frayed surface configuration, such as obtained by forcing larger chunks through a multiple hole plate grinder, are agitated in the presence of edible metallic salt until a concentration of salt-soluble protein is formed on the surface thereof, and the pieces are then pressed together to form a unitary body having the natural grain and marbling of intact meat after cooking. It has been found that, if the small chunks of meat are provided with a frayed surface configuration, then in the reassembling step, the exposed surface fibers on each of the pieces blend and knit into the surface fibers of adjacent pieces in such a way that the resulting product has the appearance of a coherent body of intact meat.

---

This invention is a continuation-in-part of copending application, United States Ser. No. 471,384, filed July 12, 1965 by Joseph C. Wilcox and Millard J. Hafstad, entitled "Meat Product and Method of Preparing Same," now abandoned.

The present invention relates to new meat products having improved characteristics and to the method of preparing same. The new meat products, produced by the method described herein, fill a previously existing need for inexpensive pre-cooked, boneless roasts or hams which are uniformly controlled as to size and shape and which can be thinly sliced in food service operations, as well as in the home, for use in sandwiches and the like.

In usual food service operations, sliced meats such as roast beef, corned beef, and ham, intended for sandwiches and for lower priced meals, are prepared by cooking large bone-in cuts of meat on the premises and then slicing thin pieces from the cooked primal cuts. Such an operation has a number of disadvantages. Special facilities must be provided for the handling and storage of raw, uncooked meat. The meat must be trimmed and then roasted or otherwise cooked for long periods of time. Labor and facilities for cooking are therefore required, and substantial cooking losses are sustained. The slicing must be done by skilled carvers, and even then the slices are of non-uniform size and shape, not well adapted for the portion-control requirements of present-day food service operations. The yield of usable meat is no more than about 60%, the remainder being fat, bones and scraps which are ordinarily discarded.

An object of the present invention is to provide for food service operators, as well as for home consumers, a meat product which enables avoidance of the disadvantages and difficulties just described. A further object is to provide a pre-cooked reassembled meat product in roast or ham form which has the texture, grain, marbling, flavor, and general consumer acceptance of intact meat but which is inexpensive and can be thinly sliced in portion-controlled sizes with yields approaching 100%. A still further object is to provide a method for preparing the new meat product. Other objects and advantages will become apparent as the specification proceeds.

The product of the present invention is a cooked reassembled meat product having the appearance of the natural grain and fat marbling of intact meat comprising a unitary body of meat made up of smaller chunks weighing from about 1 to 7 ounces and having surface fibers knit and bonded into surface fibers of adjacent chunks by surface concentrations of salt-soluble protein.

Stated in general terms, the process of the present invention comprises the steps of providing small chunks of meat having a frayed surface configuration and weighing an average of about 1 to 7 ounces each, applying edible metallic salt to the surfaces of said chunks, agitating the chunks until a concentration of salt-soluble protein is formed on the surfaces thereof, pressing the chunks together, and cooking.

The agitation or tumbling of the meat pieces in the presence of the salt causes salt-soluble proteins, such as myosin and actin, to migrate to the surface of each piece and to concentrate there in the form of a creamy, sticky coating. When the pieces are pressed together in a container, this coating has an adhesive effect and binds the pieces together in a cohesive mass. This effect is very much more pronounced after the product has been cooked, and in fact the pressed and cooked product is extremely similar in appearance, texture, and sliceability to a single large unitary piece of the type of meat from which it was derived.

The process and product of the present invention are dependent on the use of small chunks of meat having a frayed surface configuration. The frayed surfaces may be obtained by passing larger pieces of meat through a particular type of grinding apparatus, as will be hereinafter described in greater detail. Although salt-soluble proteins have heretofore been used to bind larger cuts of meat together, the process has not been thought applicable to pieces as small as 1 to 7 ounces, because with ordinary cutting and reassembling techniques the resulting product reveals the outline of each individual small piece and therefore has an artificial appearance which reduces its value to that of sausage. It has been discovered, however, that if the small pieces are provided with a frayed surface configuration, such as obtained by passing the meat through a plate grinder, then in the reassembling step the exposed surface fibers on each of the pieces blend and knit into the surface fibers of adjacent pieces in such a way that the resulting product is practically indistinguishable from larger intact pieces of meat of the type from which it was derived.

The invention is also dependent on the use of pieces averaging from 1 to 7 ounces in weight. If the pieces fall much below the 1-ounce limitation, it is difficult in the final product to avoid the "sausage" appearance, which is undesirable for the purposes of the invention. If the pieces go much above 7 ounces in weight, it becomes more difficult to fray the surfaces (such as by grinding) on a commercial production-line basis, and in addition it is not possible to practice the subsequent stuffing steps if the pieces are larger.

This invention is applicable generally to any type of red meat which is regularly produced and sold for edible purposes. This includes beef, veal, pork and lamb and also some of the other specialty meats which are less regularly sold. All grades of meat from the muscle portions of the animal are suitable for use, but the invention has particular application to the more economical cuts and grades, since there is an upgrading effect in the practice of the invention. For example, cuts designated as canner and cutters' rounds of beef are preferably used to produce a reassembled roast beef product which has a high acceptance in commercial food service operations, while items designated as canners and cutters' beef knuckles, insides and outsides are quite suitable as raw materials for highly acceptable corned beef and dried beef products made according to the invention. The invention is preferably utilized to convert raw materials of the type described into conventional forms of consumer products, such as roast beef, roast veal, roast lamb, corned beef, dried beef, ham and the like.

In preparing the meat for use in the process, the raw material is trimmed free of bones, gristle, sinew, connective tissue, visible blood clots, large sections of fat, and the like, and the trimmed product is then treated to produced small chunks weighing from 1 to 7 ounces and to abrade, tear or fray the surfaces thereof. This is preferably done by passing the large pieces of meat through a meat grinder equipped with a feed screw and knives which bear against a perforated plate. The type of perforated grinder plate found most suitable for producing chunks having the size and frayed surface configuration contemplated by the present invention is one commonly referred to as a "3-hole kidney plate." Good results are obtained with a plate about 7 inches in diameter, having three kidney-shaped holes approximately 1¼″ x 2½″ in dimension. Of course, other equivalent grinding mechanisms can be employed to produce small chunks of the desired size and surface character. For example, meat disintegrators, dicers, shredders, and the like can, if properly adjusted, be used to produce surface characteristics such as described above.

The grinding of the meat causes a noticeable rise in temperature, and in some cases it may be desired to temper and cool the ground product before subjecting it to the subsequent salting and mixing steps. Thus, for example, in the case of beef intended for the production of a roast beef product, it is desirable to bring the temperature down below 40° F. before salting and mixing. With other types of products, particularly meats intended for curing, it is not necessary to regulate the temperature and the meat may be salted and mixed immediately after comes from the grinder.

The salt to be applied to the surfaces of the small meat pieces or chunks may be any edible metallic salt which can form, with the natural moisture in the meat, a solution capable of extracting salt soluble proteins from the meat to provide a surface coating thereof. Sodium chloride, potassium chloride, and various phosphates may be mentioned as examples. Sodium chloride is preferred because it does not impart undesirable flavors unless used in excessive quantities. Other additives, such as sugar, spices, nitrites, and nitrates, may be included along with the salt without impairing the process. In fact, in the case of meats intended for curing, the entire curing mixture, including the salt, can be added at this stage.

The salt may be employed in concentrations varying over a wide range. Concentrations as low as 0.1% and as high as 8% are effective to achieve the binding function contemplated herein. Within this wide range, organoleptic considerations largely govern the concentration ultimately chosen. For example, if the end product is to be a conventional roast beeef, a salt content of 1.0 to 2.0% will be used, whereas meat intended to be processed into a typical dried beef product will be salted at a much higher concentration of about 6.5 to 8.0%. For corned beef and ham, the concentration will be in the range of about 2.0 to 4.0%.

After the salt has been applied to the surfaces of the meat pieces or chunks, the mixture is agitated or tumbled until a concentration of salt-soluble protein is formed at the surface of each piece. Any type of mixing, tumbling, or working action which manipulates or rubs the salt onto or into the raw meat surface is suitable. For example, the salted meat may be agitated in a meat mixer of known type, although other obvious means of agitation such as churns, pumps, and the like may also be employed.

The efficiency of the salt-soluble protein extraction process which proceeds during the mixing step is greater at lower temperatures and at higher salt concentrations. Therefore, in the case of products salted at lower concentrations, such as meat intended for a conventional roast beef product, it is important to keep the temperature below about 40° F. Optimum temperatures are 28–38° F. In the case of cured or highly salted products, such as meat intended for a conventional dried beef product, the temperature is not so critical for purposes of extraction efficiency, and therefore higher temperatures may be used. The mixing is continued until each piece or chunk has become soft and pliable and is covered with a creamy coating of extracted salt-soluble protein. The mixing time can be as low as 2 to 3 minutes and as high as 15 to 20 minutes but is usually in the neighborhood of 5 minutes. Agitating the meat under a vacuum or under reduced air pressure has been found beneficial in eliminating "air holes" from the final products and also improves the color of the finished product by removing entrapped air and some of the dissolved oxygen.

The meat which has been mixed or agitated as just described is then ready for the next processing stage, except that meats intended for curing may be held for the usual 5 to 12 days in order to allow the conventional curing action to take place. If this procedure is followed, then on completion of the curing it may be desired to subject the cured meat to a further slight mixing action in order to reincorporate any moisture which has separated from the meat as a result of "weeping." However, caution must be observed at this point to avoid irreversibly breaking up the set of the meat with too violent a mixing action. In fact, the preferred procedure involves taking even the meats intended for curing, stuffing them directly into casings, as described in the next paragraph, and then setting them to cure in the casings for the usual 5 to 12 days.

After completion of the mixing procedure the meat may be pressed together in containers, such as casings, to provide an end product of the desired shape. The pressure is important to allow tht adhesive nature of the salt-soluble protein coating to work for the formation of a cohesive mass. In order to produce the product of the invention in its optimum form from the standpoint of appearance, texture, grain, and general resemblance to natural, intact meat, it is preferred to introduce the meat from the mixing step into a conventional vacuum-type sausage stuffing machine and stuff it into casings slowly and under controlled pressure. In order to obtain optimum results, it is preferred that the stuffing machine be under vacuum and that the pressure be controlled as carefully as possible. It has been found that the stuffing machine, when operated under vacuum and at the lower pressures and speeds indicated above, provides a special mechanical action which serves to knit the exposed, frayed surface fibers of the meat pieces together to form a cohesive mass practically indistinguishable from the intact meat. If desired, the meat may be stuffed into casings held within screen or wire molds to provide a desired loaf or roast shape in the final product.

The packed product may then be pricked with skewers or pins to allow entrapped air to be dispelled and to permit egress of water during subsequent processing. The molded product is next cooked according to conventional processes, or it may be shipped or stored in raw form for cooking at a later time; or, as previously indicated, in the case of cured meat, it may be set to cure in the casings for the usual 5 to 12 days prior to cooking. It is not necessary for the purposes of the present specification to describe in detail the conditions and techniques for the cooking step, since these are the usual practices of the industry. Generally speaking, and taking roast beef as an example, the product may be placed on trolley cages or trees, sent to a regular meat-packing plant smokehouse to be heated (without smoking) for several hours until an internal temperature of about 148–152° F. is attained, removed from the smokehouse, showered to reduce temperature, chilled, removed from the molds, packaged, and blast-frozen. In the case of smoked products, such as ham, the heating step may also include a conventional smoke treatment.

It will be understood that it is not necessary, for the purposes of the present invention, that the meat from the mixing step be stuffed into casings. It is also possible to press the meat into aluminum pans, for example, in roast shape, and to freeze the product in raw form for roasting at a later time.

The product and process of the present invention provide a number of advantages to the meat packer. The process enables him to find a profitable outlet for small scraps of meat or for certain lower grade cuts which heretofore have been sold at reduced price. The process has an effective moisture binding function, and therefore substantially less losses in water cook-out are experienced in the packing plant. Further, since more of the natural juices are retained in the meat, the tastiness, tenderness, and nutritive value of the meat are enhanced, all of which adds to the market value and profit potential.

The food service operator, as well as the home consumer, also receives a number of benefits through use of the product. These may be enumerated as follows:

(a) No handling or storage of raw, uncooked meat is required. No trimming or pre-roasting preparation is needed.

(b) The product is prepackaged and frozen, suitable for storing until used.

(c) The product is purchased free of bone, fat and sinew, thus providing the food service operator with a savings of the 5% of bone and the 38% of fat, sinew, and connective tissue which would otherwise be cut off and discarded.

(d) No cooking losses are experienced. The product need only be reheated, with a loss of no more than 2–3%.

(e) The slicing yield approaches 100%. The meat can be cut wafer-thin, either by machine or by hand, without falling apart. No hand-carving around bones is required, and the need for experienced carvers is avoided.

(f) The product has uniform dimension, weight, flavor, and degree of doneness from day to day and week to week.

(g) No more than is actually required need be prepared and sliced.

(h) The product has the texture, grain, marbling, and flavor of intact meat and is highly acceptable to customers.

Specific examples illustrative of the invention are set out as follows:

EXAMPLE I

Preparation of roast beef product

Canner and cutter beef insides, outsides and knuckles were closely trimmed to furnish 1,093 pounds of trimmed meat. In the trimming operation, all gristle, sinew, large sections of fat, large connective tissue, and other connective tissue, if easily accessible, were removed from the rough cuts. The fell from the outsides was removed on a Townsend Skinning Machine.

The lean, trimmed meat was ground through a meat grinder (Buffalo) equipped with a 3-hole kidney plate using a 4-bladed knife and into sausage box trucks. The ground meat was spread evenly in the box trucks and placed in a cooler at 32° F. for overnight storage. Next morning the contents of the trucks (1,091 pounds) were transferred to a meat mixer (Buffalo). Salt and roast beef spice, used at a level of 1 pound 12 ounces and 8 ounces, respectively, per 100 pounds of trimmed meat, was slowly and evenly added to the meat as it was being mixed. Total mixing time was 5 minutes.

The mixed meat was transferred to a sausage stuffing machine equipped to be operated under vacuum (a No. 6 Vemag Stuffer) and, using the slowest stuffing speed setting on the machine, the meat was stuffed into pre-tied 11 x 38' plain fibrous casings which had been inserted into a stainless steel semicircular wire cage in order to provide a loaf shape in the final product. The closed end of the casing was punctured several times with a carcass shroud pin to permit the escape of any entrapped air or water in the stuffing operation. The operator maintained pressure on the wire cage while stuffing so that the meat was stuffed into the casing as compactly as possible. When the casing was filled to the end of the wire cage, the end of the casing was tied, and the tied product was thoroughly pricked on all sides with a shroud pin. The stuffed pieces weighed in the neighborhood of 19 to 20 pounds.

The stuffed pieces were then placed in trolley cages and sent to a smokehouse for processing. The house temperature was started at 140° F. and then raised 10° F. every 10 minutes until a temperature of 190° F. was reached. Ambient humidity was used the first hour and then steam was induced into the house to maintain 30% relative humidity. These conditions were held until the product reached an internal temperature of 150° F. This required 5 hours and 5 minutes. No smoke was used at any time.

The product was then removed from the smokehouse and showered with cold tap water for 1 hour until the internal temperature was reduced to 115° F. and next removed to a cooler where, after a holding period of about 5 hours, the screen cages were removed. The following day, the chipped and tied ends were cut off the finished pieces of roast beef, leaving the rest of the casing on the product. These pieces were then cut in half and each half inserted into a 9 x 24" Cryovac pouch, cut-end first. The product and pouch were vacuumized, clipped, shrunk in a hot-water bath, placed in boxes, and blast-frozen.

The end products were loaves of roast beef, weighing approximately 9 pounds each, and having in cross section a texture, grain, fat marbling, and general appearance practically indistinguishable from regular, intact roast beef.

EXAMPLE II

Preparation of roast beef product 1,201 pounds of whole canner and cutter beef rounds, rump and shank off, were trimmed to remove all gristle, sinew, large sections of fat, and all available connective tissue. The trimmed lean muscle meat, weighing 581 pounds, was ground through a meat grinder having a 3-hole kidney plate using a conventional 4-bladed knife. The ground product, varying from small pieces to irregular chunks approaching 7 ounces, were spread in several trucks and placed in a 33–38° F. cooler. The following day, this product was mixed in a 600-pound mixer for 5 minutes with salt, at the rate of 1 pound 12 ounces per cwt., and roast beef spice, at the rate of 8 ounces per cwt.

The product was then transferred to a Vemag stuffer and stuffed very slowly and very carefully into fibrous casings, with the stuffing control wheel backed off to its lowest setting. The product was stuffed into E-Z Peel fibrous casings within a Beacon screen mold. 6-tine cones were placed at the 13-inch (from open end) reinforcement of the mold to limit the stuffed size to weigh approximately 10 pounds. After stuffing the product was tied and then thoroughly pricked with a metal skewer to allow entrapped surface air pockets to be dispelled and to permit egress of moisture during processing.

The stuffed product was then cooked in a smokehouse, showered, cooled, packaged, and frozen, all according to the procedure described in Example I.

EXAMPLE III

Preparation of cooked ham product 16 to 18-pound skinned bone-in hams from hogs were used as raw material. The hams were boned, the face muscle and shank meat separated, and the balance of the ham trimmed by removing all surface fat, gristle, sinew, and visible blood clots or bruises. The portion of the butt having excessive sinew was removed.

The trimmed raw meat was put through a 3-hole kidney plate grinder using a 3-bladed knife, and then placed in a mechanical mixer, where the following ingredients were added (per cwt. of meat):

| | | |
|---|---|---|
| Granulated salt | lbs | 2½ |
| Brown sugar | lb | 1 |
| Tripolyphosphate | lb | ⅓ |
| Water | lbs | 18 |
| Sodium nitrite | oz | ¼ |
| Sodium nitrate | oz | ¼ |

The meat and the added ingredients were mixed for three minutes and then cured and held for 5 days at 36–40° F.

The cured meat was then stuffed through a Vemag vacuum-equipped sausage stuffer into E-Z Peel fibrous casings to 4½ inches thick, with the ends of the casing tied.

The stuffed pieces were placed between smokehouse screens and secured with springs to retain uniform constant pressure during processing. The smokehouse was started at 130° F. and the temperature of 170° F. was reached, and this was maintained until an internal temperature of 148–150° F. was reached. Smoke was started after the first hour of processing and was continued until the desired smoke color was obtained.

The resulting product was a tasty ham which could readily be sliced without falling apart and which provided slices having a texture, fat distribution, and general appearance indistinguishable from regular ham.

EXAMPLE IV

Preparation of dried beef product

The raw material was 700 pounds of the natural fall of beef cuts from canner and cutter beef rounds. The combination of beef cuts were trimmed free of surface fell, all kernel fat, visible blood clots, and heavy sinew, and the trimmed meat ground through a 3-hole kidney plate grinder using a 3-bladed knife.

The ground product was mixed in a mechanical mixer, at which time the following cure was added per cwt. of meat:

| | | |
|---|---|---|
| Salt | lbs | 7.5 |
| Nitrite | oz | ¼ |
| Nitrate | oz | ¼ |

The beef was mixed for 5 minutes to develop a tack exudate of salt-soluble protein on the surfaces of the ground pieces but without excessive mutilation of the chunks.

From the mix, the product was put to cure for 10 days at 36–40° F. After cure, the product was given a very short remix to reincorporate juices released during curing. Then, using a vacuum-equipped Vemag stuffer, the beef was stuffed into E-Z Peel fibrous casings to provide products approximately 28″ long, having a string loop at one end for hanging.

The product was hung in a smokehouse, and the temperature maintained at 140° F. with relative humidity of 30% for 95 hours until the beef had shrunk approximately 388–40%. No smoke was user. The dried product was removed from the smokehouse and held at room temperature for 48 hours prior to chilling and tempering for slicing. The remaining steps of slicing and packing in glass jars were carried out according to conventional practices for sliced dried beef.

EXAMPLE V

Preparation of corned beef product

Canner and cutter beef knuckles were trimmed to provide approximately 2,000 pounds of beef muscle meat for use as raw material. In the trimming operation, all heavy surface fell, gristle, large sections of fat, visible blood clots, and sinew were removed. The trimmed beef knuckles were put through a 3-hole kidney plate grinder, using a 3-blade knife, and then placed in a mechanical mixer together with the following ingredients (per cwt. of meat):

| | | |
|---|---|---|
| Salt | lbs | 2.5 |
| Sodium nitrite | oz | ¼ |
| Sodium nitrate | oz | ¼ |
| Water | lbs | 5.0 |
| Kosher type spice emulsion | ozs | 3½ |

The meat with the above ingredients was mixed for 10 minutes and then put to cure for 5 days at 36–40° F.

Following this, the cured product was mixed briefly to reincorporate any moisture which had been separated by "weeping," and then, using a vacuum-equipped Vemag stuffer, the product was stuffed slowly and carefully into 11 x 26″ pre-tied E-Z Peel fibrous casings which were enclosed in a Beacon No. 6524 stainless steel semicircular wire cage to provide a stuffed piece approximately 20 pounds in weight.

The stuffed product was placed in a smokehouse at 140° F., and the temperature was raised every 10 minutes until 190° F. was reached. This temperature was maintained with 30% relative humidity until an internal temperature of 160° F. was reached. No smoke was applied.

After processing, the product was showered 15 minutes in cold water, allowed to surface dry, and then placed in a cooler for 24 hours. After this, the casings were removed and the product inserted in 9 x 30″ Cryovac pouches, a vacuum drawn, and the end sealed with a clip. The packaged meat was dipped in a hot-water bath for 10 seconds to shrink the film and remove wrinkles, and then placed in a cooler for storage.

EXAMPLE VI

Preparation of roast beef product

U.S. Good boneless chucks, clod-in, were re-trimmed to furnish 14 pounds of trimmed meat. The meat was hand cut by knife into pieces weighing less than 8 ounces, and the cut-up mass was passed through a Rietz distintegrator in order to impart a frayed character to the surface of the meat pieces without destroying the integrity of the pieces. In a disintegrator of this type, the meat pieces are forced through a perforated plate by the action of rotating blades.

The frayed meat pieces were placed in a cooler overnight, and then salt and spice added, and the product mixed, stuffed and processed according to the procedure described in Example I.

EXAMPLE VII

Preparation of roast beef product

U.S. Good boneless chucks, clod-in, were re-trimmed to furnish 22 pounds of trimmed meat. The meat was hand-cut by knife into pieces weighing less than 8 ounces, and the cut-up mass was run through a Luthi dicer in order to impart a frayed character to the surface of the meat pieces without destroying the integrity of the pieces. In a dicer of this type, the meat pieces are run through the machine on a conveyor belt and are subjected to the action of a series of blades moving up and down above the conveyor belt. The position, speed and sharpness of the blades can be adjusted to provide the desired frayed characteristic on the surface of the meat pieces.

The frayed pieces were placed in a cooler overnight and then salt and spices added, and the product mixed, stuffed and processed according to the procedure described in Example I.

EXAMPLE VIII

Preparation of roast beef product

U.S. Good boneless chucks, clod-in, were re-trimmed to furnish 21 pounds of trimmed meat. The meat was hand-cut by knife into pieces weighing less than 8 ounces, and the cut-up mass was treated for 5 minutes in a Hobart Mixer (Model A–200) equipped with a dough hook. In a mixer of this type the meat is placed in a bowl and is subjected to the action of a revolving hook which is eccentrically mounted above the bowl, and the action of the hook works to provide a frayed condition on the surface of the meat pieces.

The frayed meat pieces were placed in a cooler overnight, and then salt and spice added, and the product mixed, stuffed and processed, all in accordance with the procedure described in Example I.

EXAMPLE IX

Preparation of beef roast in aluminum pans

U.S. Good, boneless beef chucks, square cut (clod-in), were used in the preparation of this lot. 25 chucks were boned, giving a boneless weight of 1682 pounds. 1522 pounds were trimmed to produce 673 pounds of raw material.

The lean muscle meat was ground through a meat grinder (Buffalo No. 78–B) fitted with a 3-hole plate using a 4-bladed knife. The ground meat was placed in three sausage box trucks, keeping the depth of the meat to less than 10 inches, and placed in a cooler at 32–36° F. for 36 hours. After that, the meat from all three trucks was placed in a meat mixer (Buffalo No. 5) and 11 pounds, 9 ounces of salt and 2 pounds, 2¾ ounces of roast beef spice mixture were slowly added, thus providing salt and roast beef spice mixture at a level of 1.725 pounds and 0.25 pound, respectively, per 100 pounds of trimmed meat. The meat, salt and spice were mixed for 5 minutes.

The mixed meat was transferred to a stuffing machine (Vemag) with the stuffing control wheel backed off to its lowest point to give the lowest stuffing pressure. The product was stuffed through an S-tube and a loaf filler horn into vinyl lined aluminum pans, using a masonite and styrofoam mold to prevent the pressure of the meat from bulging the pans. Exactly 2 pounds, 6 ounces of meat was placed in each pan in this manner, and then the pans were placed in boxes and transported to the blast freezer where they were frozen and stored. At a later time, the product was taken from the freezer and roasted. The resulting meat was roast beef which could readily be sliced without falling apart and which provided slices having a texture, fat distribution and general appearance indistinguishable from regular roast beef.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

We claim:

1. A method of preparing a reassembled meat product, comprising the steps of reducing said meat to small chunks weighing an average of about 1 to 7 ounces each while tearing or fraying the surfaces of said chunks to expose meat fibers thereon, applying edible metallic salt to the surface of said chunks, said edible metallic salt being applied in a concentration within the range of 0.1 to 8.0% based on the weight of said chunks, agitating said chunks until a concentration of salt-soluble protein is formed on the surface thereof, and pressing said chunks together to blend and knit the exposed surface fibers of adjacent chunks and to form a unitary body having the natural grain and marbling of intact meat after cooking.

2. The method of claim 1 wherein said small chunks of meat are provided by forcing larger chunks through a multiple-hole plate grinder.

3. The method of claim 1 wherein said edible metallic salt is sodium chloride.

4. The method of claim 1 wherein the temperature of said chunks of meat is held below about 40° F. during agitation.

5. The method of claim 1 wherein said chunks are pressed together by stuffing said chunks under vacuum and at a low pressure into a casing.

6. A method of preparing a cooked reassembled roast beef product having the natural grain and marbling of intact meat, comprising the steps of grinding pieces of beef through a multiple-hole plate grinder to provide smaller chunks of beef having a frayed surface configuration and weighing an average of about 1 to 7 ounces each, applying sodium chloride to the surface of said chunks in a concentration within the range of 1.0 to 2.5% based on the weight of said chunks, agitating said chunks at a temperature below about 40° F. until a concentration of salt-soluble protein is formed on the surfaces thereof, stuffing said chunks into casings under vacuum and at a low stuffing rate whereby the exposed surface fibers on each of the pieces blend and knit into the surface fibers of adjacent pieces in such a way that the resulting product is practically indistinguishable from larger intact pieces of meat of the type from which it was derived and then cooking until the internal temperature of said beef product is about 148 to 152° F.

7. A method of preparing a cooked reassembled corned beef product having the natural grain and marbling of intact meat, comprising the steps of grinding pieces of beef through a multiple-hole plate grinder to provide smaller chunks of beef having a frayed surface configuration and weighing an average of about 1 to 7 ounces each adding to the chunks a corned beef curing mixture containing sodium chloride in a concentration of about 2.5% based on the weight of said chunks, agitating said chunks until a concentration of salt-soluble protein is formed on the surfaces thereof, curing said mixture, remixing lightly to reincorporate separated moisture, stuffing the cured mixture into casings under vacuum and at a low stuffing rate whereby the exposed surface fibers on each of the pieces blend and knit into the surface fibers of adjacent pieces in such a way that the resulting product is practically indistinguishable from larger intact pieces of meat of the type from which it was derived and then cooking until the internal temperature of said corned beef product is about 160° F.

8. A method of preparing a cooked reassembled dried beef product having the natural grain and marbling of intact meat, comprising the steps of grinding pieces of beef through a multiple-hole plate grinder to provide smaller chunks of beef having a frayed surface configuration and weighing an average of about 1 to 7 ounces each, adding to the chunks a dried beef curing mixture containing sodium chloride in a concentration of about 7.5% based on the weight of said chunks, agitating said chunks until a concentration of salt-soluble protein is formed on the surfaces thereof, stuffing the mixture into casings under vacuum and at a low stuffing rate whereby the exposed surface fibers on each of the pieces blend and knit into the surface fibers of adjacent pieces in such a way that the resulting product is practically indistinguishable from larger intact pieces of meat of the type from which it was derived, curing the mixture, and then heating under controlled humidity until the product has shrunk approximately 38–40%.

9. A method of preparing a cooked reassembled ham product having the natural grain and fat distribution of intact meat, comprising the steps of grinding pieces of raw ham meat through a multiple-hole grinder to provide small chunks of ham having a frayed surface configuration and weighing an average of about 1 to 7 ounces each, adding to the chunks a ham curing mixture containing sodium chloride in a concentration of about 2.5% based on the weight of said chunks, agitating said chunks until a concentration of salt-soluble protein is formed on the surfaces thereof, stuffing the mixture into casings under vacuum and at a low stuffing rate, whereby the exposed surface fibers on each of the pieces blend and knit into the surface fibers of adjacent pieces in such a way that the resulting product is practically indistinguishable from larger intact pieces of meat of the type from which it was derived, curing, and then heating and smoking until an internal temperature of about 150° F. is reached.

References Cited

UNITED STATES PATENTS

| | | | |
|---|---|---|---|
| 2,240,841 | 5/1941 | Flynn. | |
| 2,247,012 | 6/1941 | Burk | 146—189 |
| 2,868,650 | 1/1959 | Hammerberg | 99—107 |
| 3,076,713 | 2/1963 | Maas | 99—107 |
| 3,285,752 | 11/1966 | Hansen et al. | 99—107 |

OTHER REFERENCES

"The Globe-Becker" published by the Globe Company, 4000 S. Princeton Ave., Chicago, Ill., pp. 1 to 4, received in the Patent Office, May 13, 1958.

"Meat," September 1959, p. 25.

HYMAN LORD, Primary Examiner